US005810705A

United States Patent [19]

Mimura et al.

[11] Patent Number: 5,810,705

[45] Date of Patent: Sep. 22, 1998

[54] DEVELOPING ROLLER

[75] Inventors: Kazuyoshi Mimura; Yoshihisa Tawada; Shigeo Akimoto; Kenji Kobayashi; Yasunori Matsunari; Susumu Fukuda, all of Otsu, Japan

[73] Assignee: Kanegafuchi Kagaku Kogyo Kabushiki Kaisha, Osaka, Japan

[21] Appl. No.: 704,349

[22] Filed: Aug. 28, 1996

[51] Int. Cl.[6] ...................................................... B23P 15/00

[52] U.S. Cl. ................................................ 492/56; 492/59

[58] Field of Search ........................ 492/56, 59; 399/333, 399/321; 428/36.91

[56] References Cited

U.S. PATENT DOCUMENTS

| | | | |
|---|---|---|---|
| 5,386,279 | 1/1995 | Fukami et al. | 355/271 |
| 5,458,937 | 10/1995 | Nakamura et al. | 428/36.91 |
| 5,581,329 | 12/1996 | Kosmider et al. | 492/56 |
| 5,582,917 | 12/1996 | Chen et al. | 492/56 |
| 5,640,662 | 6/1997 | Sugimoto et al. | 399/333 |
| 5,659,869 | 8/1997 | Ohtsuka et al. | 399/333 |

*Primary Examiner*—Irene Cuda

*Attorney, Agent, or Firm*—Armstrong, Westerman, Hattori, McLeland & Naughton

[57] ABSTRACT

A developing apparatus of a toner delivery system by contacting a developer roller with an electrostatic latent image-carrying member eliminates a protective layer in the conventional concept from a surface of the developing roller, and provides a covering layer which is formed by adhering particles of toner or a material having electrical characteristics and mechanical characteristics equal to those of the toner on the surface of the developing roller. Those particles are adhered utilizing a surface tackiness of an elastomer layer itself which is a structural element of the developing roller.

9 Claims, 2 Drawing Sheets

DEVELOPING ROLLER

BACKGROUND OF THE INVENTION

1. Field of the Invention

The present invention relates to a developing roller which is used in a developing unit incorporated in an apparatus employing an electrophotographic system, a back exposure system (so-called a chargeless system) or an electrostatic recording system, such as a printer, a copying machine or a receiver in a facsimile. More particularly, the present invention intends to provide the developing roller that exhibits the most remarkable effect when used in an apparatus employing a one-component non-magnetic development system.

2. Description of the Related Art

Electrophotographic systems include a system utilizing both a magnetic working force and an electric working force for delivery of a developer, and a system utilizing only the electric working force for delivery of a developer. The system utilizing both the magnetic working force and the electric working force also includes a system using a two-component developer comprising a magnetic carrier and a non-magnetic toner, and a system using a one-component developer consisting of a magnetic developer. To the contrary, the system utilizing only the electric working force includes a system using the one-component developer consisting of a non-magnetic toner (hereinafter referred to as "one-component non-magnetic developer).

FIG. 4 shows a developing unit in a printer or a copying machine using the one-component non-magnetic developer, and shows the peripheral structure thereof. This structure is first explained below.

A photoconductive insulative layer is formed on the surface of a photosensitive member (drum) 1 which is an electrostatic latent image-carrying member. The photoconductive insulating layer consists of a material which generally shows an electrically insulating property and shows a conductivity when irradiated with light. The photosensitive member (drum) 1 rotates in a rotating direction 1*a*, and the surface thereof is electrified uniformly with a charging device 2. The surface of the photosensitive member (drum) 1 is irradiated with a light irradiation 10 of a reflected light when scanning the surface of an original by light, through an optical system (not shown), and the areas which receive a light irradiation on the surface of the photosensitive member 1 become conductive, thereby disappearing electric charges on the areas. As a result, electrostatic latent images are formed on the surface of the photosensitive member 1. The light irradiation 10 is conducted with a light beam having an intensity modulated corresponding to an image to be recorded in, for example, a laser printer. In a copying machine, the light irradiation 10 is performed with a light derived from the reflected light when scanning the surface of an original by a light through an optical system. When a toner which is an electrified powdery one-component non-magnetic developer is coated from a developing roller 33 to a latent image formed on the surface of the photosensitive member 1, the latent image is manifested.

A toner supplied on the surface of the photosensitive member 1 is transferred onto a recording paper 4. In performing this transfer, an electrostatic suction force is acted from a back side of the recording paper 4 with a transfer machine 5. A cleaner 6 such as a cleaning blade is arranged at a downstream side of the transfer machine 5 in the rotating direction 1*a*. This cleaner 6 removes toners which are adsorbed on the surface of the photosensitive member 1 but are not transferred onto the recording paper 4.

The recording paper 4 having toners transferred thereonto is carried to a fixing apparatus 7. The fixing apparatus 7 comprises a heating roller 8 and a pressure roller 9. The recording paper 4 is passed through therebetween to thereby fix the transferred toners onto the recording paper 4.

A developing apparatus 3 has a structure that a developing roller 33 is built in a toner reservoir 31 in which a toner 12 is stored. The photosensitive member 1 is in contact with the surface of the developing roller 33 to coat the toner 12 on the surface of the photosensitive member 1. This type of development method is called a contact method. In the toner reservoir 31, a toner supplying roller 34 for sufficiently carrying the toner 12 onto the surface of the developing roller 33 and a thin layer-forming blade 36 for controlling a layer thickness of the toner on the surface of the developing roller 33 are arranged in contact with the developing roller 33.

A voltage which is negative to a ground potential is applied to the developing roller 33 through a negative electric source 37, and a voltage which is negative to the ground potential, larger than the voltage applied to the developing roller 33 in terms of an absolute value is applied to the toner supplying roller 34 through a negative electric source 38, thereby electrifying the toners adhered to, and deposited on the surface of the developing roller 33.

It should be noted that the cleaner used may be a brush or a roller, besides the blade system as shown in the drawing.

The contact type developing apparatus using the one-component non-magnetic developer and the peripheral structure thereof are as described above. However, the conventional developing roller used in the apparatus has the following disadvantages.

Since the developing roller contacts with the photosensitive member, it is required to have a softness to an extent that the photosensitive member is not damaged. Also, it is necessary that a contact width to the photosensitive member in a circumferential direction, i.e., a nip width between the developing roller and the photosensitive member, be about 0.5 to 2 mm. To this effect, it is preferred that the developing roller has a hardness of 8 to 30° as defined in JIS Hardness A.

Materials used for the developing roller include a nitrile-butadiene rubber (NBR), an ethylene-propylene-diene copolymer (EPDM), silicones, urethanes, and the like. Single use of NBR, EPDM or urethanes gives too large hardness. Therefore, if those materials are used as the developing roller, it is necessary to add a plasticizer to those materials in order to decrease the hardness. Further, a vulcanizing agent is generally added to NBR or EPDM in order to accelerate crosslinking. However, addition of such a vulcanizing agent and a plasticizer may contaminate the photosensitive member.

Regarding silicones, low molecular weight silicones tend to bleed on the surface, and therefore there is a fear that the photosensitive member may be contaminated.

Thus, in either case, there is a risk to contaminate the photosensitive member. For that reason, a protective layer is formed on the surface of the developing roller in order to prevent the photosensitive member from contamination. However, if a protective layer made of a resin is formed on the surface of the developing roller, the production steps increase. In addition, it is necessary to select a material for the protective layer, which does not adversely affect the photosensitive member and the toner, although this selection is not easy. Those elements result in increasing the production cost.

Another important problem is that charges given to the toner by the developing roller are not stable and also not constant. As a result, an image obtained is not stabilized. This is explained below.

In general, charges are applied to the toners by both triboelectrification and electrification with charges in an electric field. The triboelectrification is performed by the friction of the toner being contacted with the peripheral members until the toner in the toner reservoir is adhered onto the surface of the photosensitive member through the contact with the surface of the developing roller. Charging by applying electric field is performed by passing through the toner between the toner supplying roller and the developing roller, and between the blade and the developing roller to which electric field is applied. The toner may contain a charge control agent or the surface of the toner may be coated with a charge control agent, so that a predetermined polarity or predetermined amount of charges is imparted by friction.

Here, the important points in the electrification of the toner are that a polarity of the toner esterified is a predetermined uniform polarity, and the amount of electrification is fallen within the predetermined range. However, control of imparting charges by electric field is relatively easy, but the phenomenon of triboelectrification which is another element in imparting charges is a very unstable phenomenon. The triboelectrification is easily influenced by press-contacting force of each member to the developing roller and other environment, particularly humidity, and it is difficult to maintain a predetermined amount of charges. Further, since the triboelectrification amount varies by the change of material characteristics of the surface of the developing roller, the degree of adhesion of the toner, and the like, it is extremely difficult to always impart charges to the toner in a stable manner.

In order to control the triboelectrification, it is necessary to design the entire developing apparatus, sufficiently considering the triboelectrification rank of members to which the toner slides and contacts until the toner transfers from the toner reservoir onto the surface of the photosensitive member, but such a design is not easy. If the electrification is unstable, the electrification amount of each toner scatters, and in an extreme case, the toner having an opposite polarity may be present, resulting in remarkable decrease in image quality.

Further, there is a problem on the control of resistance value of the developing roller. It is required for the developing roller to have a resistance value in the range of about $10^3$ to $10^8$ Ω, but it is difficult to stably obtain the resistance value in such a range. In order to realize the resistance value in such a range, it is necessary to impart conductivity to the material of the developing roller in any fashion, and to adjust the roller resistance value. However, since the resistance in such a range has the tendency to greatly vary with a delicate change in the amount of the conductivity-imparting agent to be added, it is difficult to control the roller resistance value to obtain the developing roller having less scatter in resistance value.

Furthermore, there is a problem involved in colorization. In a color system, a plurality of color toners (C, Y, M, B) are used, and a plurality of developing rollers are used corresponding to those toners having a plurality of colors. Each of those color toners has a different electrification characteristic due to difference in the respective colored pigment. Therefore, it is difficult to conduct a stable color development, and matching between the developing roller and the development system is difficult.

SUMMARY OF THE INVENTION

The present invention has been made in view of the above circumstances, and an object of the present invention is to provide a developing roller which can stabilize the electrification characteristic of a toner and can attempt a high quality of an image.

Another object of the present invention is to provide a developing roller which can eliminate the occurrence of cost accompanied with the formation of a protective layer on the surface of the developing roller, and can cope with a colorization.

As a result of various investigations to overcome the above-described problems involved in the conventional technique, it has been found that the problems can be overcome by forming a protective layer that constitutes a covering layer of the developing roller with a developing toner itself or from a material having substantially same electrical characteristics and mechanical characteristics as those in the toner. It has also be found that such a constitution makes it possible to greatly reduce factors that unstabilize the amount of charges imparted to the toner, thereby being capable of substantially uniformly controlling charges imparted to the toner. Further, it has been found that the covering layer may be formed without any cost if the formation of the covering layer comprising those materials can be realized by adhering those materials utilizing surface tackiness of a conductive elastomer layer of the developing roller.

The present invention has been completed based on those findings.

According to the present invention, there is provided a developing roller which acts to deliver a toner to the surface of an electrostatic latent image-carrying member having an electrostatic latent image formed thereon, comprising a conductive axial body, an elastomer layer which is formed of a resin composition having a surface tackiness and also having a conductivity or a semiconductivity comprising a reactive organic material, formed on the surface of the axial body, and a covering layer as an outermost layer, which is formed by adhering a toner onto the surface of the elastomer layer utilizing the surface tackiness of the elastomer layer, thereby covering the surface of the elastomer layer with the toner.

In order to form the covering layer on the surface of the elastomer layer, a material to be adhered utilizing the surface tackiness needs not be the toner itself, and any material may be used if it has electrical characteristics and mechanical characteristics equivalent to those of the toner.

It can generally be understood that the term "equivalent electrical characteristics and mechanical characteristics" used herein means that a triboelectrification rank is equivalent. The triboelectrification rank is arranged based on the experiential rule such that when two substances are contacted, a substance which is positively electrified is positioned upward, and a substance which is negatively electrified is positioned downward. However, since this is not strictly prescribed, the rank may be replaced in similar substances with each other.

The surface tackiness of the elastomer layer is defined in an inclined ball tack test (inclination 30°, 23° C.) according to JIS Z 0237, and a material having a surface tackiness of 1 to 13 can be used. The inclined ball tack test is explained in detail hereinafter.

It is preferred that the toner for forming the covering layer has a nearly spherical shape from the point of clearness (definition) of the image.

The resin composition which is the constituent material of the elastomer layer comprises an oxyalkylene type, a saturated hydrocarbon type, an urethane type, or a siloxane type as a main component, which is a reactive organic material that converts from a liquid into a solid by curing reaction. Of those, the oxyalkylene type and the saturated hydrocarbon type are preferred.

The developing roller according to the present invention has a structure in which the toner itself which constitutes the covering layer of the developing roller or a material having a triboelectrification rank equivalent to that of the toner is adhered onto the surface of the elastomer layer by the surface tackiness of the resin composition which constitutes the elastomer layer. This covering layer prevents the resin composition from being directly contacted with the photosensitive member, and also functions as a protective layer to prevent from bleeding.

The toner is supplied to the covering layer of the developing roller from a toner supplying roller arranged in a toner reservoir. A material which constitutes the covering layer of the developing roller is the toner itself, or a material having electrical characteristics and mechanical characteristics equivalent to those of the toner, so that additional electrification by friction with the surface of the developing roller does not substantially occur, and imparting charges to the toner is substantially controlled by electric field generated by voltage applied to the developing roller, the toner supplying roller or a blade.

It is easy to control voltages applied to the developing roller or the toner supplying roller, so that electrification of developer particles is conducted stably, and electrification polarity of the toner and the amount of electrification are substantially uniform. As a result, a stabilized image can be obtained.

The developing roller of the present invention is suitable for color development. When developing roller of the present invention is applied to a developing apparatus of color system, the electrification characteristics of each color toner (C, Y, M, B) differ, but the surface of the developing roller provided corresponding to each color toner is covered with the same color toner or a material having electrical characteristics and mechanical characteristics equivalent to those of the same color toner. Therefore, color matching can be conducted with only control of electric field, similar to the case of monochrome, and a color development can be conducted in a stable manner.

DETAILED DESCRIPTION OF PREFERRED EMBODIMENTS

Next, the present invention is explained in detail with reference to the accompanying drawings. In the explanation described below, the present invention is explained by referring to the embodiment wherein a one-component non-magnetic developer is used as a developer, but the present invention is not limited to this embodiment.

Figure 4:
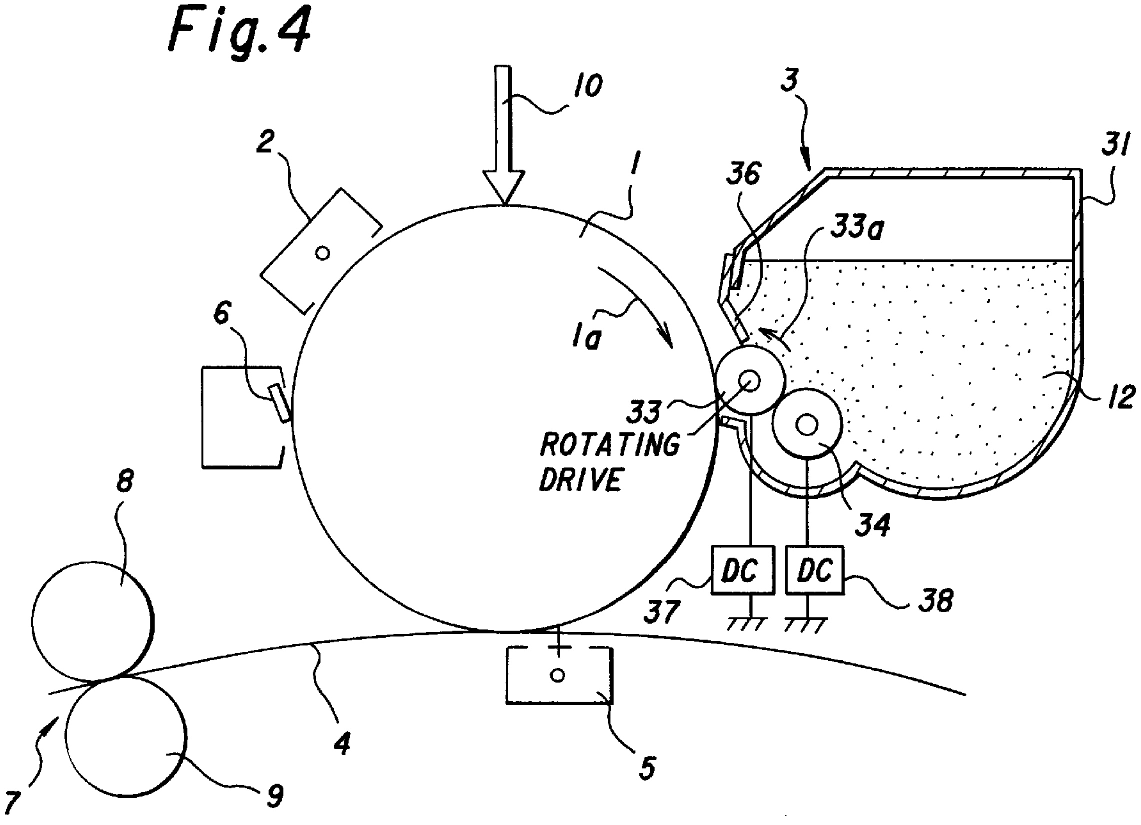
FIG. 4 is an explanatory view showing one embodiment of the developing apparatus and its peripheral structure.

The developing apparatus having the developing roller according to the present invention incorporated therein and the peripheral structure thereof can basically employ the conventional ones except for the structure of the developing roller 33 itself. For example, the developing apparatus and the peripheral structure thereof similar to those as shown in FIG. 4 can be exemplified.

The developing apparatus 3 for coating the toner on the surface of the photosensitive member (drum) 1 has such a structure that the developing roller 33 and the toner supplying roller 34 are incorporated in the toner reservoir 31 filled with the powdery toner 12. The toner is formed by covering colored pigment with a thermoplastic resin such as a styrene acrylic resin or a polyester resin. The powdery toner has a particle size of about 10 $\mu$m. The toner supplying roller 34 acts to efficiently supply the toner on the surface of the developing roller 33. The arrangement of this toner supplying roller 34 makes it possible to smoothly transfer the toner 12 to the developing roller 33, and also makes it possible to impart electric charges to the toner. In this embodiment, DC voltage of −150 to −350 V is applied to the developing roller 33 from the electric source 37, and DC voltage of −200 to −600 V is applied to the toner supplying roller 34 from the electric source 38.

The toner supplying roller 34 which can be used is a roller made of a sponge-like material such as a conductive foamed material, or a conductive cylindrical material such as a metal pipe. As specific examples of the material for the roller, urethane, aluminum, and the like are exemplified.

On the outer surface of the developing roller 33, a blade 36 as a means for controlling the thickness of the toner layer is provided. The edge of the blade is contacted with the surface of the developing roller 33 having the developing toner adhered thereonto to regulate the amount of the toner deposited on the surface of the developing roller 33. In this embodiment, the direction of the edge of the blade is opposite to a rotating direction 33*a* of the developing roller 33, but the direction of the edge of the blade is not particularly limited. A means for applying direct current voltage is arranged on the blade in order to impart predetermined charges to the toner between the blade and the developing roller, and voltage of −150 to −600 V is applied. It is preferred that the blade 36 be formed using a conductive material. The material for the blade 36 preferably has a hardness higher than the hardness of the material for the developing roller 33.

The above embodiment in which voltage is applied to the developing roller, the toner supplying roller and the blade is directed to the use of negatively charged toner, and when positively charged toner is used, the voltage to be applied has an opposite polarity. In either use of negatively charged toner or positively charged toner, AC voltage may be superimposed on DC voltage.

Figure 1:
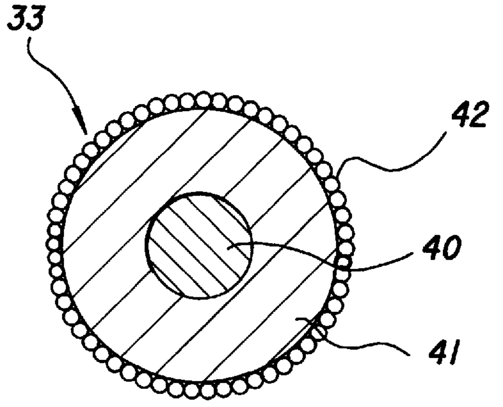
FIG. 1 is an explanatory view showing a cross sectional structure of the developing roller.

FIG. 1 is a sectional explanatory view showing a schematic structure of the developing roller 33. The developing roller 33 has a structure that an elastomer layer 41 made of a resin composition having a surface tackiness is formed on the circumference of a conductive axial body 40 such as a metal shaft and a covering layer 42 comprising a toner or the similar material is formed on the surface of the layer. In the embodiment shown in the drawing, the elastomer layer 41 is a monolayer, but the elastomer layer 41 may has a structure that a plurality of the elastomer layers having different hardness are laminated to adjust the conductivity and the hardness of the entire developing roller 33.

The metal shaft which can be used in the present invention is not particularly limited, and the shafts which are generally used as the metal shaft for the developing roller, such as iron shaft, stainless steel shaft or shaft plated with nickel or chromium, can be used.

The thickness and the hardness of the conductive composition which covers the metal shaft are also not particularly limited, and the conventionally used conductive composition having a thickness of 2 to 8 mm, and preferably 3 to 5 mm, and a hardness of 5° to 80° defined in JIS Hardness A may be used. In particular, the composition having a hardness about 8° to 30° of JIS Hardness A is preferred from the standpoint of preventing the blade and the photosensitive member (drum) from damage. The JIS Hardness A measured herein is a value obtained by producing a cylindrical sample having a diameter of 30 mm and a height of 12.7 mm with no shaft, and then measuring at 23° C.

The resin composition which constitutes the elastomer layer 41 is a composition having a surface tackiness, and includes composition having a conductivity or a semi-conductivity. The term "conductivity" used herein means a composition having a conductivity of $10^6$ Ω·cm or less, and the term "semi-conductivity" used herein means a composition having a conductivity of $10^6$ to $10^{10}$ Ω·cm.

The conductivity of the elastomer layer on the developing roller is set such that a resistance value of the entire roller is about $10^3$ to $10^8$ Ω, and preferably $10^4$ to $10^7$ Ω. Expressing this with a volume resistivity of the resin composition which forms the elastomer layer, the usable range is $10^3$ to $10^{10}$ Ω·cm, and preferably $10^5$ to $10^8$ Ω·cm. It is preferred that the volume resistivity of the elastomer layer is set to be lower than that of the toner or the equivalent material. The roller resistance value described herein is a value. measured by applying a load of 500 g to both edges of the conductive axial body and applying a direct current voltage of 100 V thereto.

The resistance value of the developing roller can be uniformly controlled in the range of about $10^3$ to $10^8$ Ω, and preferably $10^4$ to $10^7$ Ω, by setting the thickness of the covering layer so that the volume resistivity of the elastomer layer is set to satisfy the above-mentioned condition.

As a method for imparting the conductivity to the resin, addition of conductivity-imparting substances such as carbon black or metal powder is generally known. Addition of the conductivity-imparting substances is not always necessary at the high resistance side in the semiconductivity.

The covering layer 42 is formed of the toner or the equivalent material, and the toner or the equivalent material is shown by white particles in the drawing. The toner or the equivalent material which constitutes the covering layer 42 is adhered utilizing the surface tackiness possessed by the elastomer layer 41. The surface tackiness that the elastomer layer 41 possesses is an inherent property of the material. The degree of the surface tackiness of the elastomer layer 41 is 1 to 13, preferably 2 to 13, more preferably 2 to 7, and most preferably 2 to 5, by an inclined ball tack test (inclination 30°, 23° C.) according to JIS Z 0237.

Here, the inclined ball tack test is briefly explained hereunder.

Figure 3:
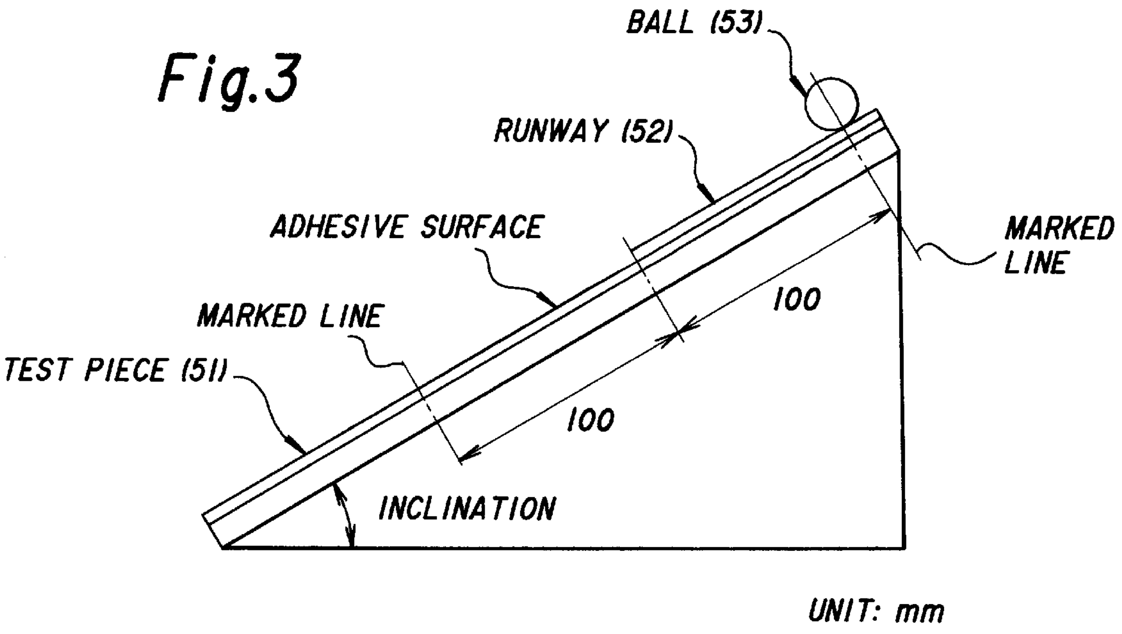
FIG. 3 is an explanatory view showing a test method of a inclined ball tack test.

FIG. 3 shows a ball rolling device used in the inclined ball tack test. The ball rolling device has a structure that a test piece 51 is adhered onto the entire length of a inclined plane inclined with a certain inclination to a horizontal plane, with facing the adhesive surface upward, a film is adhered onto a predetermined area from the upper side of the inclined face to form a runway 52, and an exposed portion of the test piece 51 positioned downward from the runway 52 constitutes a measurement portion.

A plurality of balls (steel balls) 53 having different sizes are successively rolled from the top edge of the runway 52, and it is confirmed whether or not those steel balls 53 stop on the way of the measurement portion. The degree of surface tackiness of the test piece 51 is expressed by the number of the balls that stopped.

Each element which constitutes the ball rolling device is explained below.

Inclined Plate:

The inclined plate used is a smooth and rigid plate (such as glass plate, metal plate, wood plate or plastic plate). The degree of inclination is selected from 20°, 30° and 40°. The test results also show this degree of inclination.

Runway:

Runway is formed by adhering a transparent film having a length of 100 mm or more and a thickness of 25 μm as defined in JIS C 2318 onto the tacky surface of the test piece at a predetermined position. The length of the runway is 100 mm.

Measurement Portion:

The measurement portion is a tacky face positioned in a range of 100 mm from the bottom edge of the runway.

Ball (steel Ball):

As a material of the ball, a high carbon chromium shaft ball-bearing steel defined in JIS G 4805 is used. Sizes of the ball are 31 kinds of sizes of 1/16 to 1 in "ball designation" as defined in JIS B 1501 except for 5/64, 7/64, 9/64, 15/64 and 17/64.

Using this ball rolling device, test is conducted with the following procedures (1) to (6).

(1) The test device is fixed horizontally onto a measurement stand using a level. An angle of an inclined plate is 30°. If necessary, an angle of 20° or 40° may be used.

(2) A test piece is set, facing a tacky surface upward, at a predetermined position of the inclined plate using an adhesive tape for fixing the upper edge of the test piece, an adhesive tape for fixing the lower edge of the test piece, or a sash weight (mass: about 500 g), and a polyester film for a runway is adhered to a predetermined position on the tacky surface of the test piece.

(3) The starting position of the ball is adjusted in conformity with a size of the ball so that the length of runway is constant, 100 mm.

(4) The boll, the surface of which being cleaned, is placed on the starting position, and the ball is rolled.

(5) A series of procedures of adjustment of the starting position of the ball, and rolling of ball are repeated changing the size of the ball, and of the balls which stop within the measurement portion (i.e., the ball does not move for 5 seconds or more), a ball having the largest size is found. Three balls, one having the largest size found by the same test piece, the remaining two balls having a size next larger or next smaller than the largest size, each is rolled three times, and it is confirmed that the ball found is fallen within the measurement rule.

(6) Numerical value of 32 times of "ball designation" as defined in JIS B 1501 is called ball number. The test result is expressed by the ball number of the ball found having the largest size, and an average value of three test pieces is shown as the test result. In addition, the angle of the inclined plate is also indicated in the test result.

The surface tackiness of the elastomer layer is measured by this inclined ball tack test.

If the surface tackiness decreases, the toner which becomes the covering layer is difficult to uniformly adhere.

As a result, a stable electrification to the toner which is a developer cannot be conducted, and the amount of the toner delivered does not stabilize, thereby causing an unevenness of image density and a fogging.

On the other hand, if the surface tackiness increases too much, in forming the elastomer layer, when the resin composition is poured into a mold to harden it, and the molded product is picked up thereafter, a pick-up property becomes poor. As a result, scratches may be formed on the surface of the molded product, or the life of the mold may be shortened.

In the case that the tackiness is 1 to 13, and preferably 2 to 13, the covering layer can easily be formed by adhering the one-component non-magnetic developer onto the surface of the roller, and the electrification of the one-component non-magnetic developer used as the toner and the control of the amount thereof can appropriately be conducted, so that it is preferable. In the case that development is conducted using a developing roller having the one-component non-magnetic developer adhered uniformly onto the surface of the roller, good image quality can be obtained. Furthermore, in the case that the tackiness is 2 to 7, and particularly 2 to 5, the life of the developing roller can be prolonged (evaluated by the image quality when developed 1,000 sheets). If the tackiness exceeds 13, it is difficult to conduct the development for a long period of time in a stable manner, and on the other hand, if the tackiness is less than 1, adhesion of the toner is insufficient, and the unevenness of image density or the fogging may occur as described above.

JIS Hardness A used for expressing hardness of the elastomer layer in the present invention is briefly explained below.

When a test piece having a thickness of 12 mm or more is mounted on a spring type hardness tester Model A, and a pressurized face of the tester is contacted with the test piece, a pushing needle projected from a hole formed at the center of the pressurized face by spring pressure is pushed back by a rubber face, and this distance is measured. JIS Hardness A shows this distance as a numerical value showing the hardness.

Figure 2:
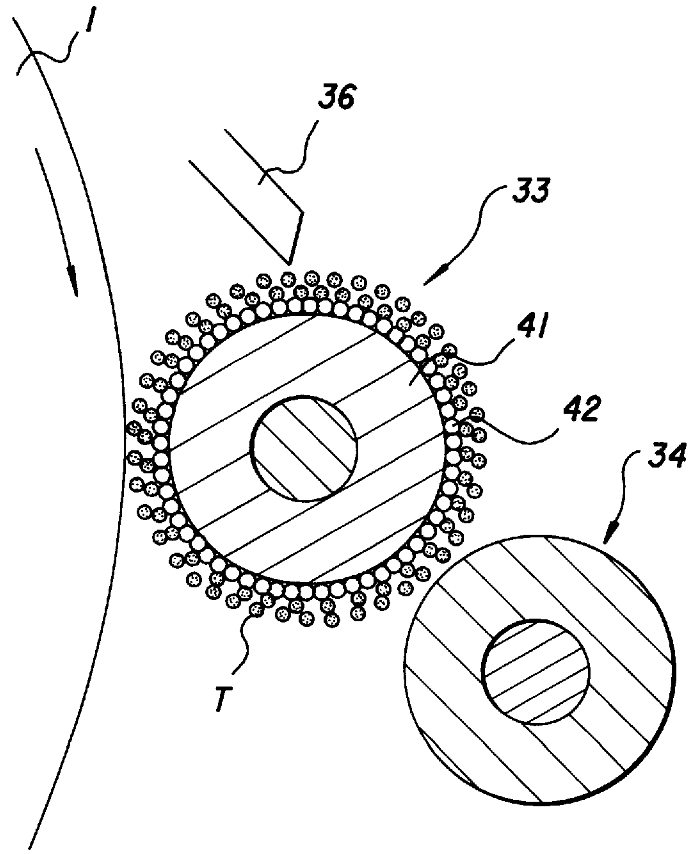
FIG. 2 is an explanatory view showing a state that a toner for development is deposited on the surface of the developing roller in the working state.

FIG. 2 shows the developing roller 33 in the driving state, and shows the state that toners T (expressed by black dots in the drawing) are deposited on the outer surface of the covering layer 42 formed on the surface of the elastomer layer 41. According to the developing roller of the present invention, since the covering layer 42 as the outermost layer thereof is formed of the toner itself or a material equivalent to the toner, a material with which the toner T for development supplied on the surface of the developing roller 33 contacts is the toner itself or a material equivalent to the toner. Therefore, it is difficult for the toner for development which has been deposited to cause the triboelectrification, and the change in the amount of electrification rarely occurs.

The material equivalent to the toner, which constitutes the covering layer preferably has the electrical characteristics and mechanical characteristics close to those of the toner in order to exclude the triboelectrification as much as possible, and therefore it is preferable to select a material, for example, having a close triboelectrification rank. Specifically, a material having a volume resistivity of $10^6$ to $10^{14}$ Ω·cm, an electrification amount of 5 to 100 $\mu$c/g of an absolute value, and a particle size of 4 to 25 $\mu$m is preferred. Further, a material for the toner-equivalent material preferably is the same materials as in the toner for development. That is, a material comprising a styrene acrylic or polyester resin, carbon black as a coloring agent and also a resistance controlling agent, silica as an inorganic additive, and an electrification controlling agent as main materials is preferred. A toner having a substantially spherical shape and a particle size of 5 to 10 $\mu$m prepared by polymerization method using those main materials is particularly preferred from the point of clearness (visibility) of image.

It is basically preferred for the covering layer comprising the toner or the toner-equivalent material to decrease the thickness thereof, but a thickness of 4 to 50 $\mu$m is preferred from the standpoints of adhesion to the toner for development and the formation of electric field. The method of forming the covering layer is not particularly limited, and any method can be employed so long as it makes the surface of the developing roller smooth. The formation can be conducted by, for example, spraying, dipping, roll coating, brush coating, or the like. In particular, when the toner-equivalent material is used as a material for covering layer, the formation of the covering layer may be conducted such that the developing roller is rotated in the toner reservoir at appropriate times in the state that the elastomer layer having the surface tackiness is exposed, thereby adhering the toner in the toner reservoir to the surface of the covering layer.

By using the toner itself or a material having electrical characteristics and mechanical characteristics equivalent to those of the toner, specifically having the equivalent electrification rank, as a material for the covering layer, the toner which is in contact with the surface of the developing roller is not likely to be electrified additionally. Therefore, the electrification polarity and the amount of electrification of the toner are mainly specified by the direction and intensity of an electric field applied to the nearest region of the toner supplying roller and the developing roller, and also the direction and intensity of an electric field applied to a toner thin film formation region by the blade 36. Control of those electric fields is easy, so that an electrification state of the toner becomes stable.

The developing apparatus according to the present invention has a very small scatter in electrification characteristics of the toner as compared with the conventional developing apparatus, and occurrence of the toner having an opposite polarity is minimized. As a result, a very stable image can be maintained.

The developing roller of the present invention does not require a resin-made protective layer which has conventionally been indispensable, thereby being capable of reducing the cost. Further, it is not necessary to select a material for a protective layer satisfying the required characteristics such as triboelectrification, and the selection of a material for the developing roller can be made with only taking roller hardness and electrical characteristics such as roller resistance into consideration.

In the constitution of the present invention, the toner which constitutes the covering layer also has a function as a protective layer, and therefore does not contaminate the photosensitive member (drum) even if a plasticizer and the like contained in the resin composition cause bleeding. In particular, when an oxyalkylene resin composition is used as a reactive organic material, the oxyalkylene resin composition does not contain a plasticizer which causes bleeding, and the amount of an unreacted product having the possibility of bleeding is very slight, thereby making it difficult to cause contamination of the photosensitive member (drum). As a result, use of the oxyalkylene resin composition is preferred from the standpoint of a long life of the developing roller.

The resin composition which is the constituent material of the elastomer layer arranged on the shaft is explained below.

The resin composition constituting the elastomer layer, which can be used, is a resin material having a conductivity or a semiconductivity and containing a reactive organic material. This resin composition is hereafter referred to as a "conductive composition".

The conductive composition comprises an oxyalkylene, a saturated hydrocarbon, an urethane, or a siloxane as a main component, and includes compositions containing a reactive organic material which becomes a solid from a liquid material upon a curing reaction. Of those compositions, a composition comprising an oxyalkylene is preferred for the reasons that it is easy to set the composition at a low hardness, the volume resistivity of the material itself is small, making it easy to impart the conductivity, viscosity of the resin prior to curing is small, making it easy to process, and it is difficult to contaminate the photosensitive member (drum). Further, the composition comprising saturated hydrocarbon is also preferred from the points that resistance when formed into a roller is $10^3$ to $10^8$ Ω and resistance variation to the atmosphere is small because water absorption is small. The curing reaction includes a reaction due to the presence of an isocyanto group, such as an urethane formation reaction or an urea formation reaction, a hydrosilylation reaction, and hydrolysis condensation reaction. Of those reaction, the hydrosilylation reaction is preferred in that curing shrinkage does not substantially occur and the curing time is short. Hereinafter, the composition comprising the oxyalkylene is referred to as a "conductive composition (1)", and the composition comprising the saturated hydrocarbon is referred to as a "conductive composition (2)".

Use of the oxyalkylene type reactive organic material is explained below.

The characteristics of this material are that it is easy to set the material to a low hardness, volume resistivity of the material itself is small, making it possible to impart conductivity, viscosity of the resin prior to curing is small, making it easy to process, and it is difficult to contaminate the photosensitive member (drum), as described before.

The preferred example of the oxyalkylene type conductive composition (1) is a conductive composition containing:

(A-1): a polymer having at least one alkenyl group in the molecule, wherein a repeating unit which constitutes the main chain comprises an oxyalkylene, (B): a compound having at least two hydrosilyl groups in the molecule (curing agent), (C): a hydrosilylation catalyst, and (D) a conductivity-imparting agent.

If the conductive composition to be obtained has a volume resistivity of a semiconductivity region, component (D) may not be used.

Component (A-1) is a component which cures by reacting with the component (B). The component (A-1) has at least one alkenyl group in the molecule. Therefore, hydrosilylation occurs to increase the molecular weight, resulting in curing.

The number of the alkenyl group contained in the component (A-1) is at least one from the point of hydrosilylation reaction of the same with the component (B). However, considering a rubber elasticity, it is preferred that two alkenyl groups are present at both ends of the molecule in case of a linear molecule, and at least two alkenyl groups are present at the ends of the molecule in case of a branched molecule.

The repeating unit which constitutes the main chain of the component (A-1) is an oxyalkylene unit. This is preferred in that the volume resistivity of $10^8$ to $10^9$ Ω·cm can be obtained by addition of a small amount of the component (D).

The composition of the component (A-1) is preferably that the repeating unit which constitutes the main chain is an oxypropylene unit from the standpoint of low hardness of a cured product.

The molecule of the component (A-1) wherein the repeating unit which constitutes the main chain is an oxyalkylene has a number average molecular weight (Mn) of 500 to 50,000, preferably 1,000 to 40,000, and more preferably 5,000 to 40,000. If the number average molecular weight is less than 500, a sufficient mechanical properties (such as rubber hardness, elongation, etc.) may not be obtained when the conductive composition (1) of the present invention is cured. On the other hand, if the number average molecular weight is larger than 50,000, the molecular weight per one alkenyl group contained in the molecule may increase, or reactivity may decrease by a steric hindrance, resulting in insufficient curing. In addition, there is a tendency that the viscosity increases so that processability becomes poor.

The oxyalkylene type polymer, preferably oxypropylene type polymer, means a polymer that at least 30%, and preferably at least 50%, of the units constituting the main chain comprise the oxyalkylene units. Units contained other than the oxyalkylene unit are units derived from a compound having at least two active hydrogens used as a starting material in the production of the polymer, such as ethylene glycol, bisphenol compound, glycerine, trimethylol propane or pentaerythritol. When the oxyalkylene polymer is the oxypropylene polymer, the polymer may be a copolymer (including a graft copolymer) of the oxypropylene with a unit such as ethylene oxide, butylene oxide, or the like.

The alkenyl group contained in the polyoxyalkylene polymer is not particularly limited, but the alkenyl group represented by the formula $$H_2C{=}C(R^5)— \quad (1)$$

wherein $R^5$ represents hydrogen atom or methyl group, is preferred from the point of excellent curability.

One of the characteristics of the conductive composition (1) is that it is easy to set the composition so as to have low hardness. In order to exhibit this characteristic, the number of the alkenyl groups is at least two at the ends of the molecule. If the number of the alkenyl groups is too large as compared with the molecular weight of the component (A-1), the composition is rigid, and it is difficult to obtain good rubber elasticity.

Representative examples of the component (A-1) are compounds represented by the following formulae (2) to (5).

$$[H_2C{=}C(R^5){-}R^6{-}O]_b{-}R^7 \quad (2)$$

$$[H_2C{=}C(R^5){-}R^6{-}O{-}\overset{\overset{\displaystyle O}{\|}}{C}]_b{-}R^7 \quad (3)$$

$$[H_2C{=}C(R^5)]_b{-}R^7 \quad (4)$$

$$[H_2C{=}C(R5){-}R^6{-}OCOO]_b{-}R^7 \quad (5)$$

The oxyalkylene type polymer prior to introducing the alkenyl group can be obtained by conventional polymerization method of alkylene oxide (anion polymerization method using sodium hydroxide) or chain extension reaction using this polymer as a raw material. Further, the oxyalkylene type polymer having a high molecular weight and a narrow molecular weight distribution and containing functional groups can be obtained by the methods described in, for example, JP-A-61-197631, 61-215622, 61-215623 and 61-218632, and JP-B-46-27250 and 59-15336.

The component (B) is not particularly limited so long as being a compound having at least two hydrosilyl groups in the molecule. However, if the number of the hydrosilyl group contained in the molecule is too large, a large amount of the hydrosilyl group tends to remain in the cured product even after curing, resulting in occurrence of voids and cracks. Therefore, the number of the hydrosilyl group contained in the molecule is 50 or less. From the standpoints of control of rubber elasticity of the cured product and the shelf life of the cured product, the number of the hydrosilyl group is preferably 2 to 30, and more preferably 2 to 20. Further, from the standpoint of easy prevention of foaming at curing, the number of the hydrosilyl group is 20 or less, and from the point that poor curing is difficult to occur even if the hydrosilyl group is deactivated, the number of the hydrosilyl group is preferably 3. In view of the above, the most preferred number of the hydrosilyl group is 3 to 20.

Having one hydrosilyl group means to have one SiH. Therefore, $SiH_2$ means to have two hydrosilyl groups. However, good curability is obtained when hydrogen atoms bonded to Si are bonded to different Si, rather than the same Si, and such is preferred from the point of a rubber elasticity.

The component (B) has a number average molecular weight (Mn) of preferably 30,000 or less, more preferably 20,000 or less, and most preferably 15,000 or less, from the points of dispersibility of the conductivity-imparting substance (the component (D)) and the roller processability. Further considering the reactivity and the compatibility with the component (A-1), the number average molecular weight is preferably 300 to 10,000.

Specific examples of the component (B) are compounds having hydrosilyl group-containing cyclosiloxanes at both ends of the molecule, as shown in the following formula (6).

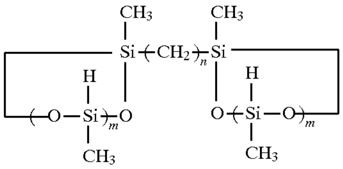

(6)

wherein n is an integer of 5 to 12, and m is an integer of 2 to 4,

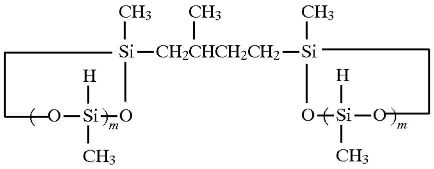

(6)

wherein m is an integer of 2 to 4,

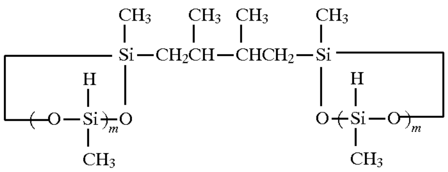

(6)

wherein m is an integer of 2 to 4.

In the formula (6), hydrosilyl group-containing cyclosiloxanes are present at both ends of a relatively low molecule, but there is no problem even if the hydrosilyl group-containing cyclosiloxanes are also present at the ends of the polymer or a branched polymer.

Examples of the component (B) also include chain or cyclic polyorganohydrogensiloxanes (including polyoxyalkylene modified product, styrene modified product, olefin modified product, and the like), as shown in the following formulae (7), (8) and (9).

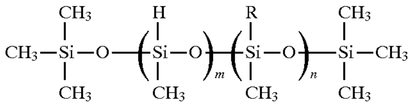

(7)

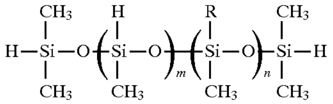

(8)

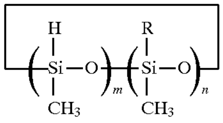

(9)

A cohesive force of the component (A-1) is larger than that of the component (B). Therefore, a phenyl group-containing modification is important for the component (B) in the point of compatibility. Styrene modified product is preferred from the points of compatibility with the component (A-1) and easy availability and denatured a-methyl styrene is preferred from the points of the shelf life.

The hydrosilylation catalyst of the component (C) is not particularly limited so long as it can be used as a hydrosilylation catalyst. Examples of the hydrosilylation catalyst which can be used include a platinum such as solid platinum supported on a carrier such as alumina, chloroplatinic acid (including a complex of an alcohol, or the like), various complexes of platinum, and chlorides of metal such as rhodium, ruthenium, iron, aluminum or titanium. Of those, chloroplatinic acid, a platinum-olefin complex and a platinum-vinylsiloxane complex are preferred from the point of catalyst activity.

Those catalysts may be used alone or as mixtures of two or more thereof.

The amounts of the component (A-1) and the component (B) used are such that the amount of the hydrosilyl group in the component (B) is 0.2 to 5.0 mols, and preferably 0.4 to 2.5 mols, per mole of the alkenyl group in the component (A-1) from the point of a rubber elasticity.

The amount of the component (C) used is $10^{-1}$ to $10^{-8}$ mol, preferably $10^{-1}$ to $10^{-6}$, and more preferably $10^{-3}$ to $10^{-6}$, per mole of the alkenyl group in the component (A-1). If the amount of the component (C) used is less than $10^{-8}$ mol, the reaction does not proceed. Further, the hydrosilylation catalyst generally is expensive and corrosive, and also has a property that a large amount of hydrogen gas generates, foaming the cured product. Therefore, it is preferred that the component (C) be used in an amount not exceeding $10^{-1}$ mol.

The conductive composition (1) of the present invention may contain the conductivity-imparting substance as the component (D) in order to obtain the desired roller resistance. However, if the roller resistance to be obtained is relatively high, the conductivity-imparting substance may not be added to the conductive composition (1).

The conductivity-imparting substance as the component (D) is a compound which can impart the conductivity to the composition. Examples thereof include carbon black, metal fine powder, organic compound or polymer each having quaternary ammonium salt group, carboxylic acid group, sulfonic acid group, sulfonic ester group, or phosphoric ester group, ether ester amide polymer, ether imide polymer, ethylene oxide-epihalohydrin copolymer, a compound having a conductive unit such as methoxypolyethylene glycol acrylate, and an antistatic agent such as a polymeric compound. Those conductivity-imparting substances may be used alone or as mixtures of two or more thereof.

When the conductive-imparting substance as the component (D) is added, the amount thereof is 30% by weight or less based on the total weight of the components (A-1), (B) and (C), so that the cured product has a volume resistivity of $10^3$ to $10^{10}$ Ω·cm.

The embodiment of using the saturated hydrocarbon type reactive organic material is explained below.

Preferred example of the saturated hydrocarbon type conductive composition (2) is a composition comprising (A-2): Polymer having at least one alkenyl group in the molecule, wherein a repeating unit which constitutes the main chain is saturated hydrocarbon, (B): Compound having at least two hydrosilyl groups in the molecule (curing agent), (C): Hydrosilylation catalyst, and (D): Conductivity-imparting substance.

Of the above components, the components (B), (C) and (D) are substantially the same as in those in the conductive composition (1) of the present invention. Therefore, explanation thereof is given to only the different portion.

Similar to the component (A-1), the component (A-2) is a component which cures by hydrosilylation reaction with the component (B). Since the component (A-2) has at least one alkenyl group in the molecule, hydrosilylation reaction occurs to increase the molecular weight, resulting in curing.

The number of the alkenyl group contained in the component (A-2) should be at least one from the point of hydrosilylation reaction with the component (B). From the point of rubber elasticity, it is preferred that two alkenyl groups are present at both ends of the molecule in the case of a linear molecule. It is also preferred in the case of a branched molecule that at least two alkenyl groups are present at the ends of the molecule.

The repeating unit which constitutes the main chain of the component (A-2) is a saturated hydrocarbon. Examples of the component (A-2) are an isobutylene polymer, a hydrogenated isoprene polymer and a hydrogenated butadiene polymer. Those polymers may contain a repeating unit of other component such as copolymer, but it is important for the component (A-2) that the amount of the saturated hydrocarbon unit is 50% or more, preferably 70% or more, and more preferably 90% or more, in that the characteristic of small water absorption of the saturated hydrocarbon type polymer is not impaired.

The component (A-2) has a number average molecular weight (Mn) of about 500 to 50,000, and preferably about 1,000 to 15,000, from the point of easy handling. The polymer which is liquid and has a flowability at normal temperature is preferred from the point of the processability.

A method of introducing the alkenyl group into the component (A-2) is not particularly limited, and the alkenyl group may be introduced during the polymerization or after the polymerization.

Preferred examples of the polymer having at least one alkenyl group in the molecule, wherein the repeating unit which constitutes the main chain is hydrocarbon, are a polyisobutylene polymer, a hydrogenated polybutadiene polymer and a hydrogenated polyisobutylene polymer, each being a linear polymer having one alkenyl group at the respective ends thereof and having a number average molecular weight (Mn) of 2,000 to 15,000 and Mw (a weight average molecular weight) /Mn of 1.1 to 1.2.

The compound (curing agent) having at least two hydrosilyl groups in the molecule, which is the component (B) used in the conductive composition of the present invention, is a component which functions as a curing agent of the component (A-2).

The components (B), (C) and (D) which can be used in the conductive composition (2) of the present invention are the same materials as in the components (B), (C) and (D) in the conductive composition (1).

The oxyalkylene type conductive composition and the saturated hydrocarbon type conductive composition are briefly described above as the preferred example of the resin composition as a material for forming an elastomer layer. The details thereof are also disclosed in U.S. Pat. No. 5,409,995, and JP-A-3-95266 and 6-256634.

The representative example of the conductive composition (1) or (2) comprising components (A-1) to (D) or components (A-2) to (D), according to the present invention is a conductive composition comprising:

Component (A): a polyisobutylene, a hydrogenated polybutadiene, a hydrogenated polyisoprene or a polyoxypropylene, each having a number average molecular weight (Mn) of 2,000 to 15,000 and having two alkenyl groups at the ends thereof;

Component (B): a hydrocarbon type curing agent having cyclic hydrogenpolysiloxanes at both ends thereof or a chain or cyclic polyorganohydrogensiloxane (a part of which may be modified with styrene), in an amount such that the amount of SiH group is 0.7 to 1.4 moles, per mole of the alkenyl group in the component (A), Component (C): $10^{-3}$ to $10^{-6}$ mol, per mole of the alkenyl group in the component (A), of chloroplatinic acid ($H_2PtCl_2$) or an alcohol solution thereof, as the hydrosilylation catalyst, Component (D): Ketjen black EC or acetylene black in an amount of 0 to 15% by weight based on the total weight of the components (A), (B) and (C).

If required and necessary, the composition comprising the above-described components (A), (B), (C) and (D) may contain a shelf life improver as a component (E) for the purpose of improving the shelf life.

Any material known as the shelf life improver for the component (B) can be used as the component (E) if it achieves the desired object.

Preferred examples of the component (E) include a compound having an aliphatic unsaturated bond, an organophosphorus compound, an organic sulfur compound, a nitrogen-containing compound, a tin compound and an organic peroxide. Specific examples thereof include benzothiazole, thiazole, dimethylmaleate, dimethylacetylene decarboxylate, 2-pentene nitrile, 2,3-dichloropropene and quinoline. However, the component (E) is not limited to those materials. Of those, thiazole, benzothiazole and dimethylmaleate are particularly preferred from the point of both the pot life and the rapid curability.

The shelf life improver may be used alone or as mixtures of two or more thereof.

The amount of the component (E) used can optionally be selected so long as the component (E) uniformly disperses in the component (A) and the component (B), but the amount thereof preferably is $10^{-6}$ to $10^{-1}$ mole per mole of the Si-H group-containing compound as the component (B). If the amount of the component (E) used is less than $10^{-6}$ mole, the shelf life of the component (B) is not sufficiently improved, and if the amount thereof exceeds $10^{-1}$ mole, curing may be impaired.

The conductive composition (1) or (2), optionally containing the shelf life improver, according to the present invention cures by the reaction of the alkenyl group with the hydrosilyl group to form a a rapid-curable cured product having a small volatile content. Further, since the cured product of the conductive composition (1) of the present invention contains the oxypropylene type polymer (A-1) as the main component (in an amount of 60 to 98% by weight, and preferably 90 to 97% by weight, based on the weight of the cured product), the conductivity or semiconductivity of about $10^3$ to $10^9$ Ω·cm can be obtained even by addition of the component (D) in a small amount, and the conductive composition having the characteristic that a rubber elasticity including low temperature characteristics is good can be obtained.

If required and necessary, the composition of the present invention prepared from the above-described components (A) to (D), and optionally the component (E), may contain a tackifying resin for the purpose of increasing the surface tackiness of the elastomer layer, a filler, an antioxidant, a plasticizer, an ultraviolet absorber, a pigment, a surfactant, or the like.

Examples of the tackifying resin include a rosin ester resin, a terpene-phenol resin, an aromatic petroleum resin, a xylene resin, a phenolic resin, and a phenol-modified resin. It is preferred to use the resin having a good compatibility with the reactive organic material.

Examples of the filler include silica fine powder, magnesium carbonate, clay, talc, titanium oxide, zinc white, diatomaceous earth, and barium sulfate.

The tackiness of the surface of the elastomer layer necessary for the developing roller of the present invention can be controlled by changing the type and the amount of the curing agent in the case of the conductive compositions (1) and (2).

The conductive composition (1) or (2) comprising the above-described components (A) to (D) according to the present invention is introduced in to a mold having a shaft made of SUS arranged therein at the center thereof by cast molding, injection molding or extrusion molding, and molded by heat curing at a temperature of about 30° to 150° C., and preferably 80° to 140° C. for from 10 seconds to 1 hour, and preferably 1 to 20 minutes. After semi-curing, the molded product may be post-cured.

In forming the elastomer layer using the conductive composition, it is important for the developing roller to have the nip width of a certain width or more to the respective control blade and the photosensitive member when the completed developing roller is incorporated into the developing apparatus. The conductive composition has a hardness of 40° or less, and preferably 30° or less, as defined by JIS Hardness A from the standpoint of having such a nip width. The component (A) and the component (B) are used in amounts such that the amount of the hydrosilyl group in the component (B) is 0.2 to 2.5 moles, and preferably 0.4 to 2.5 moles, per mole of the alkenyl group in the component (A).

Of the materials which can be used as the resin composition which is the material for forming the elastomer layer of the present invention, the embodiment of using an urethane type resin composition as the reactive organic material is explained below.

The preferred example of the conductive composition (3) of the present invention using the urethane type reactive organic material is, for example, a conductive composition comprising:

(F): a polymer having at least one active hydrogen group in the molecule, wherein the repeating unit which constitutes the main chain comprises oxyalkylene or polyester, (G): a compound having at least two isocyanato groups in the molecule, (H): a polyurethane formation catalyst, and (D): the conductivity-imparting substance.

If the conductive composition to be obtained has a volume resistivity of a semiconductivity region, the component (D) may not be added.

If required and necessary, the conductive composition may contain a plasticizer, and also the additives as described above.

The component (F) is a component which cures by reacting with the component (G). Since the component (F) has at least one active hydrogen group in the molecule, a polyurethane formation reaction occurs to increase the molecular weight, resulting in curing.

The number of the active hydrogen group contained in the component (F) should be at least one, and preferably 2 to 5, from the point of the polyurethane formation reaction with the component (G). From the point of the rubber elasticity, it is preferred that the active hydrogen groups be present at both ends of the molecule.

The active hydrogen group may be an active hydrogen group formed by only active hydrogen, or may be an active hydrogen group which is present in the form of hydroxyl group, amino group or carboxyl group. Although not particularly limited, it is preferred that the active hydrogen group be present in the form of hydroxyl group from the point of easy availability. Further, if it is desired to decrease the tackiness of the cured product, it is preferred that the active hydrogen group be present in the form of amino group.

The repeating unit which constitutes the main chain of the component (F) is preferably formed from the oxyalkylene unit or the ester unit from the point of low hardness of the cured product. The oxyalkylene unit, particularly oxypropylene unit, is more preferred from the low hardness.

Specific example of the component (F) containing an active hydrogen group as hydroxyl group, wherein the repeating unit of the main chain is the oxyalkylene unit, is a polyoxyalkylene polyol obtained by polymerizing an alkylene oxide having 2 to 4 carbon atoms with a compound (starting material) having at least two active hydrogens, used in producing the component (A-1). The polyoxyalkylene polyol preferably used to produce the component (A-1) is also preferably used as the component (F) of the conductive composition (3) of the present invention.

Specific examples of the component (F) containing the active hydrogen group, wherein the repeating unit of the main chain is the ester unit, include polylactones such as ring-opening polymer of ε-caprolactone, and polycondensates of polyoxyalkylene polyol, dicarboxylic acid and low molecular weight diol.

Polybutadienes, hydrogenated polybutadienes, and polyols (polyolefin polyols) such as polyisoprene can also be used in place of the component (F) or together with the component (F).

Specific examples of the compound having at least two isocyanato groups in the molecule as the component (G) include toluene diisocyanate (TDI), diphenylmethane diisocyanate (MDI), crude or polymeric MDI, hexamethylene diisocyanate (HDI), xylylene diisocyanate (XDI), hydrogenated xylene diisocyanate ($H_6XDI$), isophorone diisocyanate (IPDI), tetramethylxylene diisocyanate (TMXDI), hydrogenated diphenylmethane diisocyanate ($H_{12}MDI$), and derivatives obtained by prepolymerizing those compounds. Of those, aliphatic diisocyanate compounds such as hexamethylene diisocyanate are preferred from the point of low hardness. Those compounds may be used alone or as mixtures of two or more thereof.

The component (G) as the curing agent and the component (F) are used in amounts such that the equivalent ratio of isocyanato group in the component (G)/hydroxyl group in the component (F) is 0.7/1.0 to 2.0/1.0, and preferably 0.9/1.0 to 1.5/1.0, considering unstability of the isocyanato group.

Specific examples of the polyurethane-formation catalyst as the component (H) include organic tin compounds and tertiary amines. which are conventionally used. Those compounds are generally used in an amount of about 0.01 to 1% by weigh based on the total weight of the component (F) and the component (G).

The component (D) is the same as the component (D) used in, for example, the conductive composition (1) of the present invention, and therefore the explanation thereof is omitted.

The plasticizer which can be added to the conductive composition (3) of the present invention is used to decrease the hardness of the cured product. However, when the plasticizer is added, bleeding tends to occur as compared with no addition of the plasticizer.

It is preferred to add a large amount of the plasticizer from the point of low hardness, but it is preferred to add a small amount of the plasticizer from the point of decreasing the bleeding. The amount of the plasticizer added is generally about 3 to 10% by weight based on the total weight of the components (F), (G), (H) and (D).

Specific examples of the plasticizer include phthalic acid plasticizers such as DOP or DBP, and polyether plasticizers such as polypropylene glycol (PPG) or polyethylene glycol (PEG).

Production of the roller, and the like can be conducted according to the cases of the conductive compositions (1) and (2) of the present invention, and the explanation thereof is omitted.

The embodiment of using the siloxane type reactive organic material as the reactive organic material is explained below.

The preferred examples of the conductive composition (4) of the present invention using the siloxane type reactive organic material are a conductive composition comprising:

(I): a two-part room temperature-vulcanizable (RTV) silicone rubber, (J): a curing agent, (K): a curing catalyst, and (D): the conductivity-imparting substance.

and a conductive composition comprising:

(L): one-part RTV silicone rubber, (M): a curing agent, (N): a curing catalyst, and (D): the conductivity-imparting substance.

If the conductive composition to be obtained has a volume resistivity in a semiconductivity region, the component (D) may not be added.

The conductive composition comprising the components (I) to (K) and (D) has a good depth vulcanizability wherein the surface and the inside are uniformly cured, and a good release property, and on the other hand, the conductive composition comprising the components (L) to (N) and (D) has a good adhesiveness. Therefore, a composition having the combined characteristics of those two kinds of the conductive compositions is preferred, and to this effect, a mixture of those conductive compositions may be used.

When the tow-part RTV silicone rubber as the component (I) is an addition type curable rubber, an alkenyl group such as vinyl group is present in the molecule. This group reacts with hydrosilyl group present in the curing agent to cause curing similar to the cases of the conductive compositions (1) and (2) of the present invention.

The two-part RTV silicone rubber used is a silicone rubber conventionally used, and the curing agent therefor is, for example, a siloxane type compound in the component (B) which is the curing agent for the conductive composition of the present invention. The curing catalyst used here is the same as used in the conductive compositions (1) and (2) of the present invention.

The one-part RTV silicone rubber used as the component (L) is a rubber having a silanol group in the molecule, and the curing agent (M) used is a compound having at least two hydrolyzable silyl groups. The silanol group formed by hydrolysis of the hydrolyzable silyl group contained in the curing agent and the silanol group in the one-part RTV silicone rubber are dehydration condensated to cure.

The one-part RTV silicone rubber and the curing agent therefor which can be used are conventional ones. Examples of the curing catalyst include organotin compounds such as dibutyltin laureate, dibutyltin dimaleate, dioctyltin dilaurate, dioctyltin dimaleate or tin octylate; phosphoric acid or phosphoric ester such as phosphoric acid, monomethyl phosphate, monoethyl phosphate, monobutyl phosphate, monooctyl phosphate, monodecyl phosphate, dimethyl phosphate, diethyl phosphate, dibutyl phosphate, dioctyl phosphate or didecyl phosphate; organotitanate compounds; organoaluminum compounds; saturated or unsaturated polycarboxylic acid or acid anhydrides such as maleic acid or acid anhydride thereof; amines such as hexyl amine, di-2-ethylhexyl amine, N,N-dimethyldodecyl amine or dodecyl amine; and reaction products of those amines and acidic phosphoric ester. The mixtures thereof have high activity and are excellent.

In order to adjust the characteristics and to decrease the cost, the conductive composition (4) of the present invention may contain fillers such as fumed silica, precipitated silica, hydrophobic silica, carbon black, titanium dioxide, ferric oxide, aluminum oxide, zinc oxide, quartz powder, diatomaceous earth, calcium silicate, talc, bentonite, asbestos, glass fiber or organic fiber. Those filler may be used alone or as mixtures of two or more thereof. Further, additives except the fillers may be used alone or as mixtures of two or more thereof.

The production of the roller can be conducted according to the cases of the conductive compositions (1) and (2) of the present invention, and the explanation thereof is omitted.

Compositions other than the conductive compositions (1) to (4) of the present invention are compositions comprising nitrile butadiene rubber (NBR), styrene butadiene rubber (SBR), chloroprene rubber (CR) or an ethylene-propylene rubber such as EPDM or an millable silicone rubber, and a conductivity-imparting substance added thereto, and compositions comprising the above compositions and additives further added thereto. Those compositions are thermoplastic, and therefore differ from the above-described thermosetting compositions which form rubbery materials after curing. Of the above rubbers, NBR and EPDM are preferred in having a good balance between hardness and compression set when using as the roller.

The millable silicone rubber is a heat-curable rubber obtained by using a linear polyorganosiloxane (raw rubber) having a high degree of polymerization (6,000 to 10,000) as the main raw material, compounding a reinforcing or extending silica type filler as a dispersion accelerator, and also various additives such as a heat resistance improver, an inner release agent or a pigment with the raw rubber to prepare a rubber compound, adding an organic peroxide type curing agent to the rubber compound, and kneading the resulting mixture. In general, the raw rubber contains methylvinylsiloxane units.

The present invention is described in more detail by reference to the following examples, but it should be understood that the invention is not construed as being limited thereto.

EXAMPLE 1

100 g of a polyoxypropylene polymer (A-1) (90% of OH at both ends of the polyoxypropylene were allyetherified) having a number average molecular weight (Mn) of 8,000, a molecular weight distribution (Mw/Mn) of 2.0 measured by gel permeation chromatography (GPC) and a viscosity of 130 P(at 20° C.), 6.9 g of a polysiloxane type curing agent (B-i) having SiH value of 0.358 mole/100 g represented by the following formula (10)

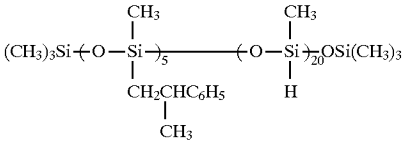

(10)

0.06 g of a 10% isopropyl alcohol solution of chloroplatinic acid ($H_2PtCl_6$), and 0.5 g of Ketjen black EC were mixed, and degassed under reduced pressure of 10 mmHg for 120 minutes.

The composition thus obtained was applied to the periphery of a stainless steel shaft having a diameter of 12 mm, and cured in a mold at 120° C. for 30 minutes to produce a roller having a 3 mm thick elastomer layer on the periphery of the stainless steel shaft.

The initial mold releasability was good. Further, the cured product was sufficiently adhered onto the stainless steel shaft.

Both ends of the roller were placed on a V block-shape support, and a polyester type pulverized toner as a one-component non-magnetic developer was sprayed on the surface of the rubber elastomer layer of the roller while rotating the roller. The thickness of the toner layer was measured with an outer diameter measuring machine (manufactured by Keyence Co.) and was found to be about 30 μm. The developing roller thus obtained was set at the predetermined position of a laser printer, and image evaluation was performed. As a result, a sufficient image density was obtained, and fogging phenomenon did not occur. Thus, very good result could be obtained. The image could be maintained even after 1,000 printed matters.

Using the above composition, a film having a thickness of about 50 μm was prepared using an applicator under the same conditions as above. When tackiness of the surface of the film was measured with an inclined ball tack test (inclination 30°, temperature 23° C.) according to JIS Z 0237, the grade was 5. Since the tackiness when formed into a roller and the tackiness of a film have the same values if the curing conditions are the same, the tackiness evaluation of the film was employed in place of the tackiness evaluation of the roller.

Further, a cylindrical sample (no shaft) having a diameter of 30 mm and a height of 12.7 mm was prepared using the above composition, and hardness thereof was measured according to JIS Hardness A. As a result, the hardness was 13°.

EXAMPLE 2

A roller having a rubber elastomer layer was produced in the same manner as in Example 1. A polyester type polymer toner as a one-component non-magnetic developer was sprayed on the surface of the elastomer layer of the roller, and a covering layer was formed in the same manner as in Example 1. Both initial image and image after 1,000 printed matters were good.

EXAMPLE 3

A roller was produced in the same manner as in Example 1 except that the polysiloxane type curing agent was changed to 2.7 g of a polysiloxane type curing agent having SiH value of 0.97 mole/100 g represented by the following formula (11)

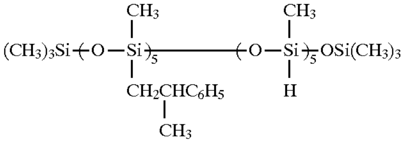

(11)

and image evaluation was made. As a result, very good results could be obtained. Further, good image was maintained even after 1,000 printed matters. The initial mold releasability was good, the surface tackiness was 2, and JIS Harness A was 21°.

EXAMPLE 4

A roller was produced in the same manner as in Example 1 except that 60 g of YS POLYSTER S-145 (manufactured by Yasuhara Yushi K.K.; terpene-phenol resin) were added to the rubber compound, and evaluated. The initial image was very good, but density unevenness occurred after about 1,000 printed matters, although fogging did not occurred. In addition, the initial mold releasability in producing the roller was slightly poor. The surface tackiness was 13, the JIS Hardness A was 11°, and the thickness of the toner layer was about 35 μm.

EXAMPLE 5

A roller was produced in the same manner as in Example 3 except that 20 g of titanium oxide was added to the rubber compound, and evaluated. The initial image had density unevenness, but the degree of image did not change even after 1,000 printed matters. Further, the initial mold releasability was good, the surface tackiness was 1, the JIS Hardness A was 23°, and the thickness of the toner layer was about 20 μm.

The results obtained in Examples 1 to 5 above are shown in

Table 1 below.

In the results shown in Table 1, Example 2 is the result where a polyester type polymer toner was previously adhered, and other Examples are the results where a polyester type pulverized toner was previously adhered.

TABLE 1

| Example | Surface | First printed matter (initial) | | One thousand-the printed matter | | Initial mold | JIS Hardness | Thickness of toner |
|---|---|---|---|---|---|---|---|---|
| No. | tackiness | Intensity | Fogging | Intensity | Fogging | releasability | A (°) | (μm) |
| 1 | 5 | very good | none | very good | none | good | 13 | 30 |
| 2 | 5 | very good | none | very good | none | good | 13 | — |
| 3 | 2 | very good | none | very good | none | good | 21 | — |
| 4 | 13 | very good | none | slight intensity unevenness | none | slightly good | 11 | 35 |
| 5 | 1 | slight intensity unevenness | none | slight intensity unevenness | none | good | 23 | 20 |

EXAMPLE 6

A roller was produced in the same manner as in Example 5 except that the toner adhered was changed to the polyester type polymerization method toner, and evaluated in the same manner as in Example 5. The tackiness was 1. However, the image up to 1,000 printed matters did not show density unevenness and fogging, and development was very good.

EXAMPLE 7

A roller was produced using a composition composed of 100 g of a polyisobutylene polymer having number average molecular weight (Mn) of 10,000 and having two terminal vinyl groups, 2.5 g of a curing agent having SiH value of 0.97 mole/ 100 g (containing 1 g of dimethyl maleate as a shelf life improver in 100 g of the curing agent) represented by the following formula (12)

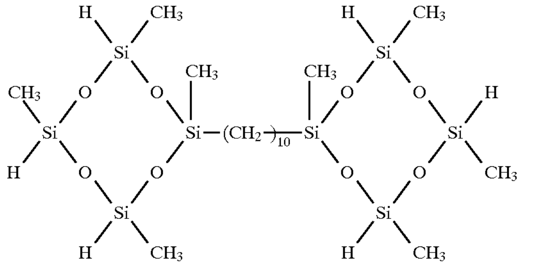

(12)

75 g of a plasticizer PS-32 (paraffin type, manufactured by Idemitsu Kosan Co.), 3 g of Ketjen black EC, and 0.06 g of a 10% isopropyl alcohol solution of chloroplatinic acid ($H_2PtCl_6$), and was evaluated in the same manner as in Example 6. Image up to 1,000 printed matters was very good. Further, the initial mold releasability was good, the surface tackiness was 2, and the JIS Hardness A was 15°.

EXAMPLE 8

A roller was produced in the same manner as in Example 7 except that a polyisobutylene polymer having a number average molecular weight of 6,000 and having two terminal vinyl groups was used in place of the polyisobutylene polymer having a number average molecular weight of 10,000 and having two terminal vinyl groups, the amount of the curing agent used was changed to 4.2 g, and the plasticizer PS-32 was not used, and was evaluated in the same manner as in Example 7. The image up to 1,000 printed matters was very good. Further, the initial surface mold releasability was good, the surface tackiness was 1, and the JIS Hardness A was 29°.

EXAMPLE 9

A roller was produced using a composition composed of 100 g of C-4190 (the main chain is polyether, NCO content: 4.5%; viscosity 700 cS/75° C.; manufactured by Nippon Polyurethane Co.), 12.9 g of 4,4'-methylene-bis-2-chloroaniline. and 0.8 g of Ketjen black EC under the curing conditions of 100° C. and 10 hours. The toner was adhered thereonto and evaluated, in the same manners as in Example 6. The first printed matter showed good image, but slight density unevenness was observed as compared with , for example, Example 6. And, the density unevenness was observed also after 1,000 printed matters. The initial mold releasability was good, the surface tackiness was 1, and the JIS Hardness A was 78°.

EXAMPLE 10

A roller was produced in the same manner as in Example 9 except that a composition composed of 100 parts of a prepolymer (350 P at 4 rpm, 23° C.) terminated with isocyanato groups obtained by reacting isophorone diisocyanate (IPDI) with both ends of PPG having a number average molecular weight (Mn) of 8,000 (dibutyltin laureate catalyst, 80° C.x2 hours), 25 parts of a polyoxypropylene triol (PPT) having a number average molecular weight (Mn) of 3,000, and a tin catalyst was cured at 80° C. for 4 hours. The roller thus obtained was evaluated. Both the first and thousandth printed matters had a good image, but a sight density unevenness was observed as compared with, for example, Example 6. The initial mold releasability was good, the surface tackiness was 2, and the JIS Hardness A was 32°.

EXAMPLE 11

A roller was formed using a composition composed of 100 g of CHEMIGUM N683B (NBR type rubber having bonded acrylonitrile content of 33% and a Mooney viscosity of 28 (ML-4-100° C.)) manufactured by Good Year Tire Co., and 5 g of Ketjen black EC by injection method. The initial mold releasability was good. The roller thus obtained was evaluated in the same manner as in Example 6. Both the first and thousandth printed matters showed good results as the same as in Example 9, but slight density unevenness was observed as compared with, for example, Example 6. The surface tackiness was 1 to 2, and the JIS Hardness A was 45°.

COMPARATIVE EXAMPLE 1

A protective layer having a thickness of about 50 μm was provided on the surface of the roller obtained in Example 1 using a 20% methanol solution of CM-8000 (copolymerization nylon, manufactured by Toray Co.) The surface tackiness was 0 and the toner was not adhered onto the surface. However, as a developing roller utilizing electrostatic force, very good image was obtained until 1,000 printed matters. Fogging was slightly observed even through it was in the level that had no practical problem. In this case, the number production steps was large, and the production cost was increased as compared with the above-described Examples.

COMPARATIVE EXAMPLE 2

A roller was produced in the same manner as in Example 4 except that the amount of YS POLYSTAR-S-145 used was changed to 80 g, but the roller could not be taken out of the mold. The surface tackiness was 15, and the JIS Hardness A was 9°.

The results obtained in Examples 6 to 11 and Comparative Examples 1 to 2 are shown in Table 2 below.

TABLE 2

| Example No. | Type of conductive composition | Tackiness | Adhesion of toner | one thousand-the printed matter Intensity | Fogging | initial mold releasability | JIS Hardness A (°) | Thickness of toner (μm) |
|---|---|---|---|---|---|---|---|---|
| 6 | Curable oxypropylene type | 1 | very good | very good | none | good | 23 | 20 |
| 7 | Curable isobutylene type | 2 | very good | very good | none | good | 15 | — |
| 8 | Curable isobutylene type | 1 | very good | very good | none | good | 29 | — |
| 9 | Curable urethane type | 1 | good | slight intensity | none | good | 78 | — |
| 10 | Curable urethane type | 2 | good | | none | good | 32 | |
| 11 | NBR type | 1–2 | good | unevenness good good | none | good | 45 | — |
| Comparative | Curable oxypropylene type + | 0 | not adhered | very good | slight | good | 13 | — |
| Example 1 | Nylon | 15 | — | — | — | Not taken out | 9 | — |
| Example 2 | Curable oxypropylene type | | | | | | | |

It can be understood from the results shown in Tables 1 and 2 above that when the surface tackiness of the rubber elastomer layer is 1 to 13, and preferably 2 to 13, in the inclined ball tack test (inclination 30°, 23° C.), the one-component non-magnetic developer is well adhered, and the electrification and the amount of the one-component non-magnetic developer thereon can be made uniform, thereby good image can be obtained.

On the other hand, it is understood that when the surface tackiness is more than 13, the initial mold releasability becomes poor, and when the surface tackiness is 15 or more, the roller cannot be released from the mold.

The developing roller according to the present invention has the following effects.

(1) Since the surface of the developing roller is covered with a toner itself or a material having electrical and mechanical characteristics substantially equal to those of the toner, the chance that the developing toner contacts with foreign materials can be minimized as less as possible. Therefore, the factors for determining the electrification polarity and the electrification amount of the toner can substantially be limited to only the direction and strength of the electric field for electrification, it is possible to make the electrification polarity and the electrification amount of the toner stable, a sufficient image density can be obtained without fogging, and very stable image can be obtained. Further, such a useful developing roller can be obtained by merely adhering the toner itself or a material having electrical and mechanical characteristics substantially equal to those of the toner on the surface of the developing roller utilizing the surface tackiness of the developing roller. Therefore, the production cost does not increase.

(2) The covering layer comprising a toner or a material having substantially the same triboelectrification rank, which covers the surface of the developing roller also exhibits the function as the protective layer which prevents the conductive composition from being directly contacted with the photosensitive member (drum). Therefore, it is not necessary to arrange a protective layer made of a resin, which requires cost for formation of such layer, and there is no problem on the contamination of the photosensitive member (drum).

(3) In the case of applying the developing roller to a color system developing apparatus, although the electrification characteristics of each color toner (C, Y, M, B) differ, the surface of the developing roller arranged corresponding to each color toner is covered with the same color toner or a material having substantially the same electrical and mechanical characteristics as the same color toner, so that color matching can be performed with only control of electric field as the same as in monochrome, and a stable color development can be conducted.

What is claimed is:

1. A developing roller which acts to deliver a toner to a surface of an electrostatic latent image-carrying member having an electrostatic latent image formed thereon, comprising a conductive axial body, an elastomer layer which is formed from a resin composition having a surface tackiness and also having a conductivity or a semiconductivity, comprising a reactive organic material, formed on a surface of the axial body, and a covering layer as an outermost layer, which is formed by adhering a toner on the surface of the elastomer layer utilizing the surface tackiness of the elastomer layer, thereby covering the surface of the elastomer layer with the toner.

2. A developing roller which acts to deliver a toner to a surface of an electrostatic latent image-carrying member having an electrostatic latent image formed thereon, comprising a conductive axial body, an elastomer layer which is formed from a resin composition having a surface tackiness and also having a conductivity or a semiconductivity comprising a reactive organic material, formed on a surface of the axial body, and a covering layer as an outermost layer, which is formed by adhering a material having substantially the same electrical and mechanical characteristics as the toner on the surface of the elastomer layer utilizing the surface tackiness of the elastomer layer, thereby covering the surface of the elastomer layer with the material.

3. The developing roller as claimed in claim 1, wherein the surface tackiness of the elastomer layer is in a range of 1 to 13 in an inclined ball tack test (inclination 30°, 23° C.) according to JIS Z 0237.

4. The developing roller as claimed in claim 3, wherein (the toner) which forms the covering layer has a nearly spherical shape.

5. The developing roller as claimed in claim 3, wherein the resin composition which is the constituent material of the elastomer layer is oxyalkylene type, saturated hydrocarbon type, urethane type or siloxane type resin composition, and is a curable resin composition comprising a reactive organic material which becomes from a liquid to a solid by the curing reaction.

6. The developing roller as claimed in claim 5, wherein the curable resin composition is the oxyalkylene type resin composition, and the curing reaction is hydrosilylation reaction.

7. The developing roller as claimed in claim 5, wherein the curable resin composition is the saturated hydrocarbon type resin composition, and the curing reaction is hydrosilylation reaction.

8. The developing roller as claimed in claim 2, wherein the surface tackiness of the elastomer layer is in a range of 1 to 13 in an inclined ball tack test (inclination 30° , 23° C.) according to JIS Z 0237.

9. The developing roller as claimed in claim 8, wherein the material having substantially the same electrical and mechanical characteristics as the toner which forms the covering layer has a nearly spherical shape.

* * * * *